United States Patent
Bond et al.

(10) Patent No.: US 11,804,962 B2
(45) Date of Patent: Oct. 31, 2023

(54) SYSTEM AND METHOD FOR ESTABLISHING AN IN-VEHICLE CRYPTOGRAPHIC MANAGER

(71) Applicant: GM GLOBAL TECHNOLOGY OPERATIONS LLC, Detroit, MI (US)

(72) Inventors: Jacob Alan Bond, Rochester Hills, MI (US); Eduard Shpati, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 17/244,542

(22) Filed: Apr. 29, 2021

(65) Prior Publication Data
US 2022/0353075 A1  Nov. 3, 2022

(51) Int. Cl.
| | | |
|---|---|---|
| *H04L 9/32* | (2006.01) | |
| *H04L 9/08* | (2006.01) | |
| *H04L 9/14* | (2006.01) | |
| *B60R 25/24* | (2013.01) | |
| *G05B 19/042* | (2006.01) | |
| *H04L 67/12* | (2022.01) | |

(52) U.S. Cl.
CPC ............ *H04L 9/321* (2013.01); *B60R 25/241* (2013.01); *G05B 19/042* (2013.01); *H04L 9/0866* (2013.01); *H04L 9/0869* (2013.01); *H04L 9/14* (2013.01); *H04L 67/12* (2013.01); *B60R 2325/108* (2013.01); *G05B 2219/2637* (2013.01); *H04L 9/3226* (2013.01)

(58) Field of Classification Search
CPC ... H04L 9/32; H04L 9/321; H04L 9/08; H04L 9/0869; H04L 9/0866; H04L 9/0897; H04L 9/088; H04L 9/14; H04L 63/12; H04L 63/123; H04L 63/06; H04L 63/068; B60R 25/241; G05B 19/04; G05B 19/042
See application file for complete search history.

(56) References Cited

U.S. PATENT DOCUMENTS

| | | |
|---|---|---|
| 8,832,825 B2 | 9/2014 | Cicala |
| 9,280,563 B2 | 3/2016 | Chittar et al. |
| 9,425,963 B2 | 8/2016 | Nairn et al. |
| 9,438,581 B2 | 9/2016 | Nairn |
| 9,998,494 B2 | 6/2018 | Nairn et al. |
| 2013/0111203 A1 | 5/2013 | Baltes et al. |

(Continued)

FOREIGN PATENT DOCUMENTS

CN   110626356 A   12/2019

*Primary Examiner* — Shaqueal D Wade-Wright (57) ABSTRACT

An in-vehicle encryption system for use in a vehicle comprising a plurality of vehicle subsystems. The system comprises a security ECU module that communicates with a remote cryptographic module, the security ECU module comprising a processor and a per vehicle master secret (PVMS) value stored in the security ECU module. The security ECU module uses the PVMS value to authenticate with the remote cryptographic module and to establish an external encrypted communication link with the remote cryptographic module. The system further comprises a first subsystem ECU module that generates a first globally unique identifier (GUID) and a second subsystem ECU module that generates a second GUID. The security ECU module uses the first GUID value to establish a first encrypted communication link with the first subsystem ECU module.

12 Claims, 10 Drawing Sheets

(56) References Cited

U.S. PATENT DOCUMENTS

| | | | |
|---|---|---|---|
| 2013/0173112 A1* | 7/2013 | Takahashi | H04L 9/0894 |
| | | | 713/168 |
| 2018/0227120 A1* | 8/2018 | Takemori | H04L 9/08 |
| 2019/0028267 A1* | 1/2019 | Takemori | H04L 9/3242 |
| 2019/0028448 A1* | 1/2019 | Farrell | H04L 63/062 |
| 2019/0238555 A1* | 8/2019 | Buffard | H04L 67/12 |
| 2019/0367016 A1 | 12/2019 | Brannstrom et al. | |
| 2020/0211301 A1* | 7/2020 | Zhang | H04L 63/065 |

\* cited by examiner

SYSTEM AND METHOD FOR ESTABLISHING AN IN-VEHICLE CRYPTOGRAPHIC MANAGER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and, in particular, to security systems and methods that use cryptography to protect the integrity and operation of a vehicle system.

Electronic control unit (ECU) modules comprising a microprocessor and an associated memory control an increasing number of the subsystems in autonomous and manually driven vehicles. In conventional practice, a vehicle manufacturer receives subsystems containing ECU modules from suppliers. The suppliers have already loaded (or injected) cryptographic keys, component IDs, and related data into each ECU module. The vehicle manufacturer then assembles the subsystems containing the ECU modules into the vehicle. When the vehicle manufacturer knows the specific ECU modules that are installed in each vehicle, the vehicle manufacturer may then load or inject additional cryptographic materials into each of the ECU modules in the vehicle.

The distribution of the cryptographic materials among different suppliers and the vehicle manufacturer presents obvious security problems. In addition, the multiple steps involved in injecting the cryptographic materials into the ECU modules and tracking the cryptographic materials associated with each vehicle adds cost to the manufacturing process. Furthermore, the vehicle manufacturer public keys are placed in firmware with no method for revocation or renewal.

SUMMARY

It is an object of the present disclosure to provide, for use in a vehicle system comprising a plurality of vehicle subsystems, an in-vehicle encryption system. The in-vehicle encryption system comprises a security ECU module configured to communicate with a remote cryptographic module, the security ECU module comprising a processor and a per vehicle master secret (PVMS) value stored in the security ECU module. The security ECU module uses the PVMS value to authenticate with the remote cryptographic module and to establish an external encrypted communication link with the remote cryptographic module. The in-vehicle encryption system further comprises a first subsystem ECU module configured to generate a first globally unique identifier (GUID) and to transmit the first GUID value to the security ECU module and a second subsystem ECU module configured to generate a second globally unique identifier (GUID) and to transmit the second GUID value to the security ECU module. The security ECU module uses the first GUID value to establish a first encrypted communication link with the first subsystem ECU module.

In one embodiment, the first subsystem ECU module is further configured to generate a first random number and to transmit the first random number to the security ECU module.

In another embodiment, the security ECU module further uses both the first random number and the first GUID value to establish the first encrypted communication link with the first subsystem ECU module.

In still another embodiment, the security ECU module generates a first key that is used to establish the first encrypted communication link, wherein the first key is based on the first random number, the first GUID value, and the PVMS value.

In yet another embodiment, the security ECU module uses the second GUID value to establish a second encrypted communication link with the second subsystem ECU module.

In a further embodiment, the second subsystem ECU module is further configured to generate a second random number and to transmit the second random number to the security ECU module.

In a still further embodiment, the security ECU module further uses both the second random number and the second GUID value to establish the second encrypted communication link with the second subsystem ECU module.

In a yet further embodiment, the security ECU module generates a second key that is used to establish the second encrypted communication link, wherein the second key is based on the second random number, the second GUID value, and the PVMS value.

In one embodiment, the security ECU module is further configured to transmit the first GUID value, the first random number, the second GUID value, and the second random number to the cryptographic module via the external encrypted communication link.

In another embodiment, the first subsystem ECU module is further configured to generate a third key that is used to establish a third encrypted communication link with the second subsystem ECU module, wherein the third key is based on the first random number and the second GUID value.

In still another embodiment, the second subsystem ECU module is further configured to generate a fourth key that is used to establish the third encrypted communication link with the first subsystem ECU module, wherein the fourth key is based on the second random number and the first GUID value.

It is another object of the present disclosure to provide a method of in-vehicle encryption for use in a vehicle system comprising a plurality of vehicle subsystems. The method comprises: i) in a security ECU module comprising a processor and a per vehicle master secret (PVMS) value stored in the security ECU module; a) authenticating with a remote cryptographic module using the PVMS value; and b) establishing an external encrypted communication link with the remote cryptographic module using the PVMS value. The method further comprises: ii) in a first subsystem ECU module, generating a first globally unique identifier (GUID) and transmitting the first GUID value to the security ECU module; iii) in a second subsystem ECU module, generating a second globally unique identifier (GUID) and transmitting the second GUID value to the security ECU module; and iv) in the security ECU module, using the first GUID value to establish a first encrypted communication link with the first subsystem ECU module.

In one embodiment, the method further comprises, in the first subsystem ECU module, generating a first random number and transmitting the first random number to the security ECU module.

In another embodiment, the method further comprises, in the security ECU module, using both the first random number and the first GUID value to establish the first encrypted communication link with the first subsystem ECU module.

In still another embodiment, the method further comprises, in the security ECU module, generating a first key that is used to establish the first encrypted communication link, wherein the first key is based on the first random number, the first GUID value, and the PVMS value.

In yet another embodiment, the method further comprises, in the security ECU module, using the second GUID value to establish a second encrypted communication link with the second subsystem ECU module.

In a further embodiment, the method further comprises, in the second subsystem ECU module, generating a second random number and transmitting the second random number to the security ECU module.

In a still further embodiment, the method further comprises, in the security ECU module, using both the second random number and the second GUID value to establish the second encrypted communication link with the second subsystem ECU module.

In yet another embodiment, the method further comprises, in the security ECU module, generating a second key that is used to establish the second encrypted communication link, wherein the second key is based on the second random number, the second GUID value, and the PVMS value.

In another embodiment, the method further comprises, in the security ECU module, transmitting the first GUID value, the first random number, the second GUID value, and the second random number to the cryptographic module via the external encrypted communication link.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure describes an apparatus and method for generating and agreeing on cryptographic keys for an in-vehicle cryptographic architecture through in-vehicle processes. This prevents exposure of cryptographic keys to external parties and simplifies the manufacturing of electronic control unit (ECU) modules and assembly of vehicle systems.

The disclosed apparatus and method utilize trusted component and assembly-time processes to establish an in-vehicle cryptographic manager and cohesive cryptographic architecture. This eliminates exposure of cryptographic keys during manufacturing and assembly and reduces manufacturing complexity as most ECU modules no longer need keys to be injected from an external source. This significantly reduces the cost of injecting keys. The disclosed apparatus and method generate the component identifiers (IDs) and cryptographic keys within the vehicle through a combination of: i) on-board ECU computations to generate globally unique IDs; ii) generation of inter-ECU cryptographic keys; and iii) an In-vehicle key generator.

Figure 1:
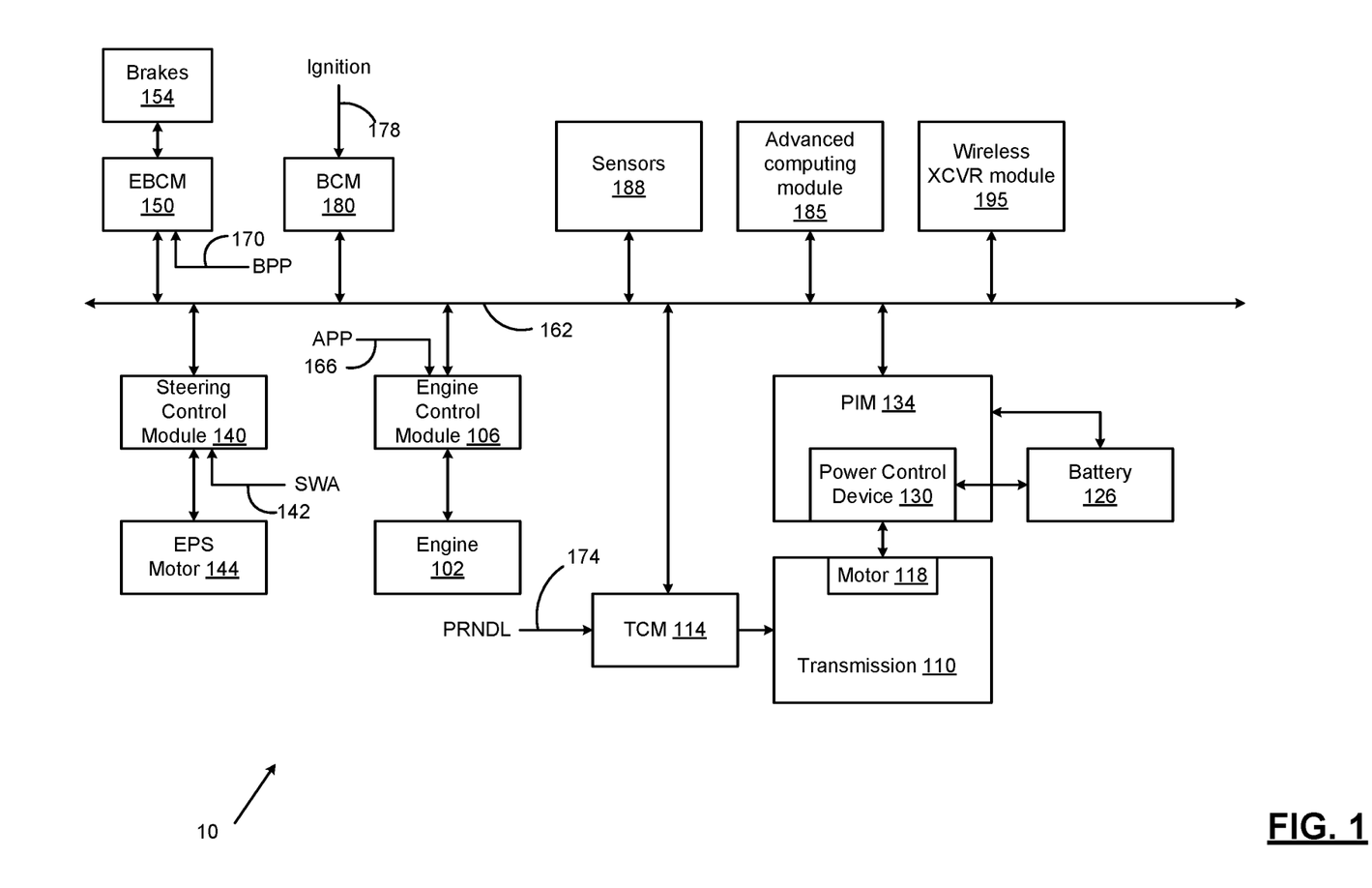
FIG. 1 is a functional block diagram of an exemplary vehicle system 10 that includes an in-vehicle cryptographic manager and cohesive cryptographic architecture according to the principles of the present disclosure.

FIG. 1 is a functional block diagram of an exemplary vehicle system 10 that includes an in-vehicle cryptographic manager and cohesive cryptographic architecture according to the principles of the present disclosure. While the present disclosure shows and describes a vehicle system 10 that is a hybrid vehicle having a driver, the present disclosure is also applicable to non-hybrid vehicles incorporating only an internal combustion engine, to purely electrical vehicles (EVs), and to driverless autonomous vehicles (AVs). While the present disclosure uses a vehicle as an exemplary embodiment, the present disclosure is also applicable to non-automobile implementations, such as boats and aircraft.

An engine 102 combusts an air/fuel mixture to generate drive torque. An engine control module (ECM) 106 controls the engine 102 based on one or more driver inputs. For example, the ECM 106 may control actuation of engine actuators, such as an electronically controlled throttle valve, one or more spark plugs, one or more fuel injectors, valve actuators, camshaft phasers, an exhaust gas recirculation (EGR) valve, one or more intake airflow boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 10 may include one or more electric motors. For example, an electric motor 118 may be implemented within the transmission 110 as shown in the example of FIG. 1A. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

In vehicle system 10, an embedded microprocessor that executes program instructions in an associated embedded memory controls the operations of each of the electronic vehicle subsystems. Hereafter, the microprocessor and memory in each subsystem may be referred to generically as an electronic control unit (ECU) module. The steering control module 140, the engine control module 106, and the electronic brake control module 150 are all examples of vehicle subsystems. A dedicated embedded ECU module controls each one of these vehicle subsystems. Each ECU module in a vehicle subsystem executes a kernel program that controls the overall operation of that particular vehicle subsystem in the vehicle system 10. The critical code of the kernel is usually loaded into a separate area of memory protected from access by third party application programs and other less critical parts of the vehicle system 10.

According to an exemplary embodiment of the present disclosure, the vehicle system 10 further comprises an advanced computing module 185, a sensors module 188, and a wireless transceiver (XCVR) module 195. The sensors module 188 may include a plurality of sensors that support, for example, basic cruise control, full speed range adaptive cruise control, and/or semi-autonomous or true autonomous driving. These sensors may include, but are not limited to, an on-board GPS receiver, a plurality of radar detectors and a plurality of cameras that detect objects (e.g., other vehicles) proximate the vehicle system 10, a light detection and ranging (LiDAR) system, a wheel speed sensors, a steering wheel angle (SWA) sensor, a plurality of accelerometers, and the like.

The advanced computing module 185 comprises a high performance computing platform that controls many of the higher order functions and lower order functions of the vehicle system 10. In a typical implementation, the advanced computing module 185 may be implemented as a microprocessor and an associated memory. Like the ECU modules in the vehicle subsystems, the advanced computing module 185 also executes a kernel program that controls the overall operation of the advanced computing module 185. The advanced computing module 185 is also responsible for communicating with external cloud servers via the wireless transceiver module 195.

According to the principles of the present disclosure; the advanced computing module 185 comprises the primary ECU module that acts as an in-vehicle cryptographic manager that communicates with other ECU modules in vehicle subsystems in order to generate and agree on cryptographic keys through in-vehicle processes. Only the primary ECU module communicates with external servers, thereby preventing exposure of cryptographic keys to external parties and simplifying the manufacturing of electronic control unit (ECU) modules and assembly of vehicle systems.

Figure 2:
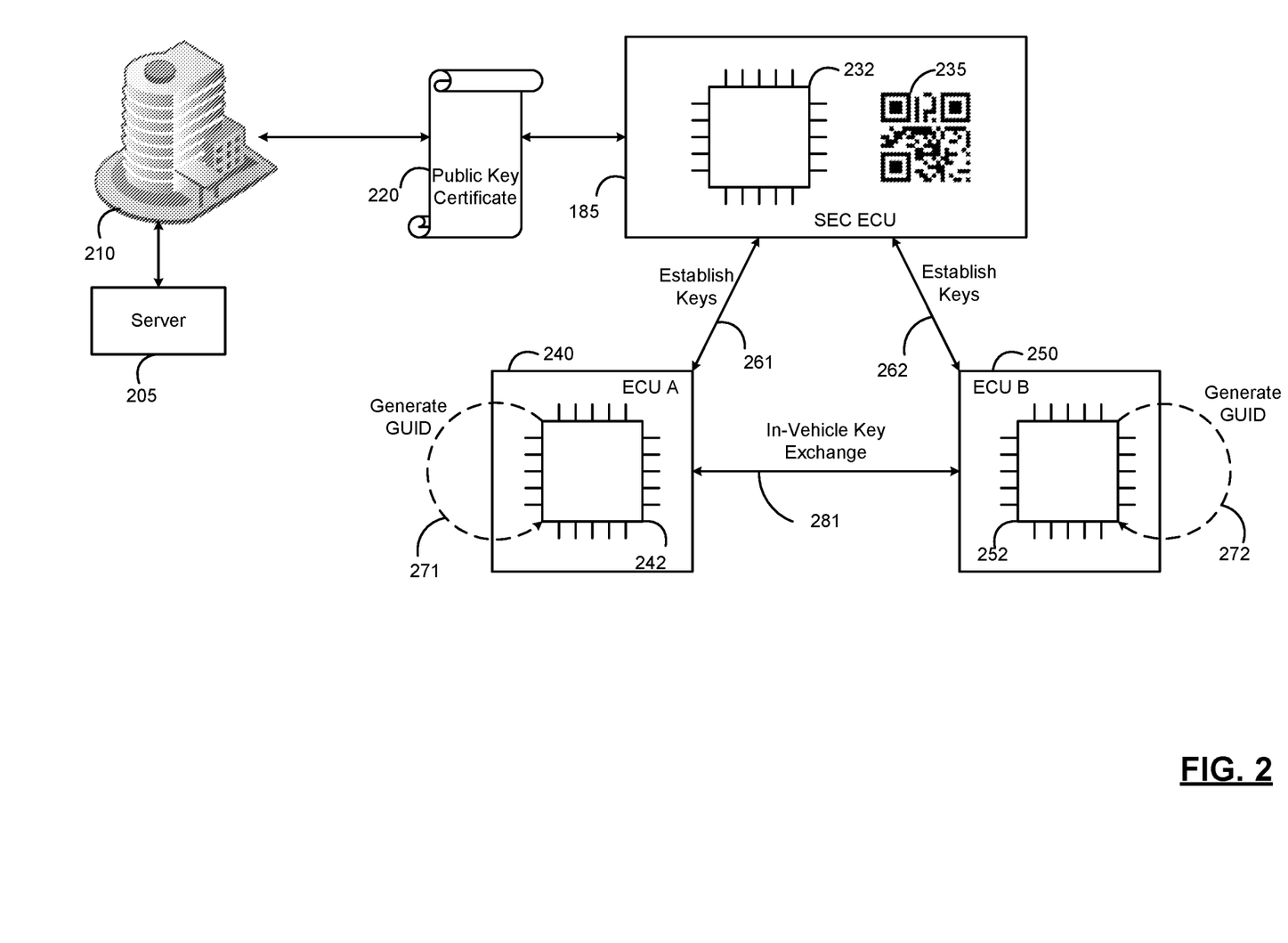
FIG. 2 illustrates the components of the in-vehicle cryptographic manager and cohesive cryptographic architecture according to the principles of the present disclosure.

FIG. 2 illustrates the components of the in-vehicle cryptographic manager and cryptographic architecture according to the principles of the present disclosure. The cryptographic architecture comprises a remote cryptographic module 205 and a back office 210 and, within the vehicle system 10, a security electronic control unit (SEC ECU) module 185, and a plurality of subsystem electronic control unit (ECU) modules. The plurality of subsystem ECU modules include exemplary subsystem ECU module 240 (or ECU A), and exemplary subsystem ECU module 250 (or ECU B). Many other subsystem ECU modules many also be present in the vehicle system 10. However, for the sake of brevity, only two exemplary subsystem ECU modules are discussed. In an advantageous embodiment, the advanced computing module 185 is configured to operate as the security ECU module 185 (or cryptographic manager).

The security ECU module 185 comprises a processor 232 and an associated memory that stores a per vehicle master secret (PVMS) value 235 that is associated only with the security ECU module 185 and is known to the remote cryptographic module 205. In the exemplary embodiment, the PVMS value 235 is represented by a graphic of a Q-Code. However, this is for representative purposes only. In an actual embodiment, the secret value 235 may be a long primary number, such as an RSA key, or a point on an elliptic curve, or the like. The security ECU module 185 uses the PVMS value 235 to authenticate itself to the remote cryptographic module 205, which creates a public key certificate 220 when it authenticates the PVMS value 235. According to the principles of the present disclosure, the PVMS value 235 is the only encryption key that is used to communicate with the remote cryptographic module 205 and is the only cryptographic key associated with the vehicle system 10 of which the remote cryptographic module 205 is aware.

The subsystem ECU A module 240 comprises a processor 242 and an associated memory. The subsystem ECU A module 240 is configured to generate a globally unique identifier (GUID) 271 that is used to create security keys that establish a secure communication link 261 with the security ECU module 185. The subsystem ECU B module 250 also comprises a processor 252 and an associated memory. The subsystem ECU B module 250 is configured to generate a globally unique identifier (GUID) 272 that is used to create security keys that establish a secure communication link 262 with the security ECU module 185. Lastly, the subsystem ECU A module 240 and the subsystem ECU B module 250 are configured to generate additional security keys that are used in an in-vehicle key exchange on a secure communication link 281. The security ECU module 185, the subsystem ECU A module 240, and the subsystem ECU B module 250 communicate with each other using the communication links 261, 262, and 281 over the controller area network (CAN) 162. Alternatively, the modules may communicate over a local Ethernet or AVB network.

FIGS. 3A-3H illustrate the operation of the in-vehicle cryptographic manager and cryptographic architecture according to the principles of the present disclosure. Initially, in FIG. 3A, the security ECU module 185 transmits in 305 its PVMS value 235 to the back office 210 of the vehicle manufacturer for authentication by the remote cryptographic module 205. The remote cryptographic module 205 stores the PVMS values 235 associated with each security ECU module 185 in each vehicle system 10 manufactured by the vehicle manufacturer. In this way, the remote cryptographic module 205 requires only one confidential or secret value to authenticate the vehicle system 10 and all of its subsystems.

Figure 3A:
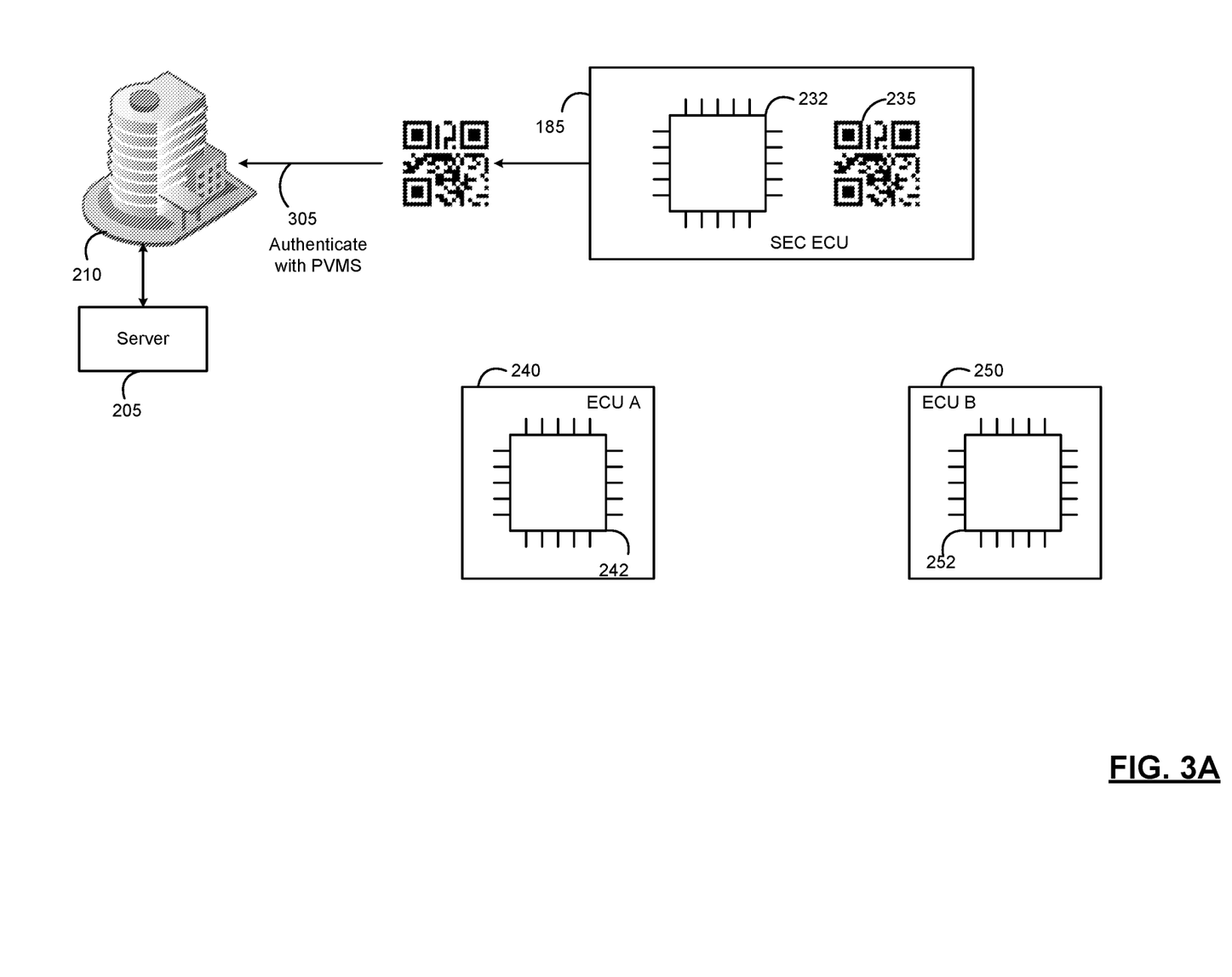
FIGS. 3A-3H illustrate the operation of the in-vehicle cryptographic manager and cohesive cryptographic architecture according to the principles of the present disclosure.
Figure 3B:
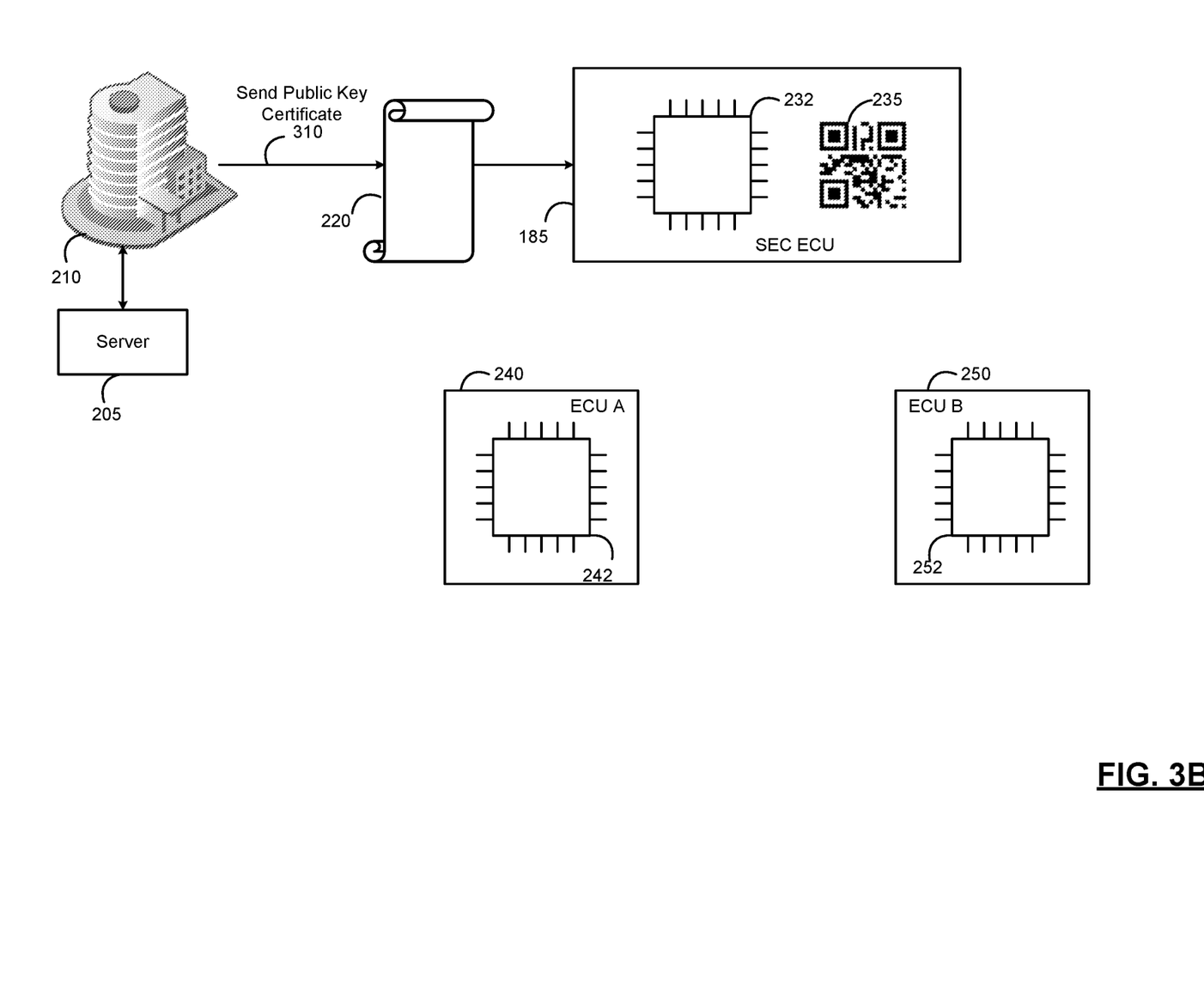

Next, in FIG. 3B, the remote cryptographic module 205 in 310 transmits a public key certificate 310 to the security ECU module 185 in the vehicle system 10. Thereafter, the security ECU module 185 uses the public key certificate 310 to encrypt communications with the remote cryptographic module 205. A public key certificate is a data file or document that proves ownership of a public key. The certificate includes information about the key, the identity of the key owner (the subject), and the digital signature of an entity that has verified the certificate's contents (the issuer). If the signature is valid, the Issuer uses the key to communicate securely with the certificate's subject.

Figure 3C:
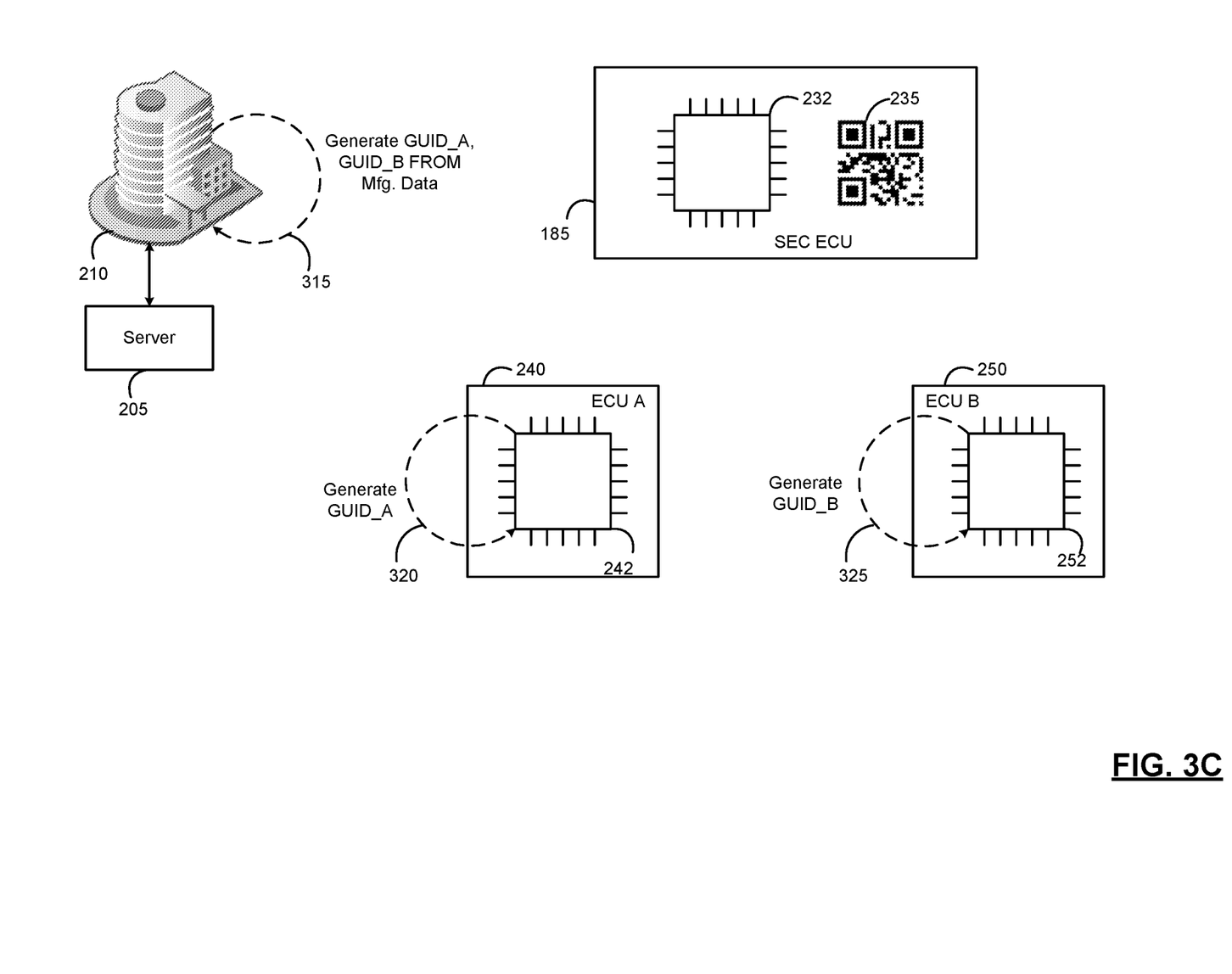

In FIG. 3C, each of the subsystem ECU modules generates a globally unique identifier (GUID) value using data that is stored in the subsystem ECU module. In 320, subsystem ECU A module 240 generates a GUID_A value. In 325, subsystem ECU B module 240 generates a GUID_B value. In an exemplary embodiment, the subsystem ECU modules generate their respective GUID values using manufacturer data, such as the subsystem ECU module serial number, the subsystem ECU module manufacturer name, the model or type of the subsystem ECU module, and the like. This manufacturer data is never the same for two different subsystem ECU modules. In this manner, the algorithm for generating each GUID value uses a unique data set that ensures that each subsystem ECU module is the only one capable of generate its particular GUID value.

Figure 3D:
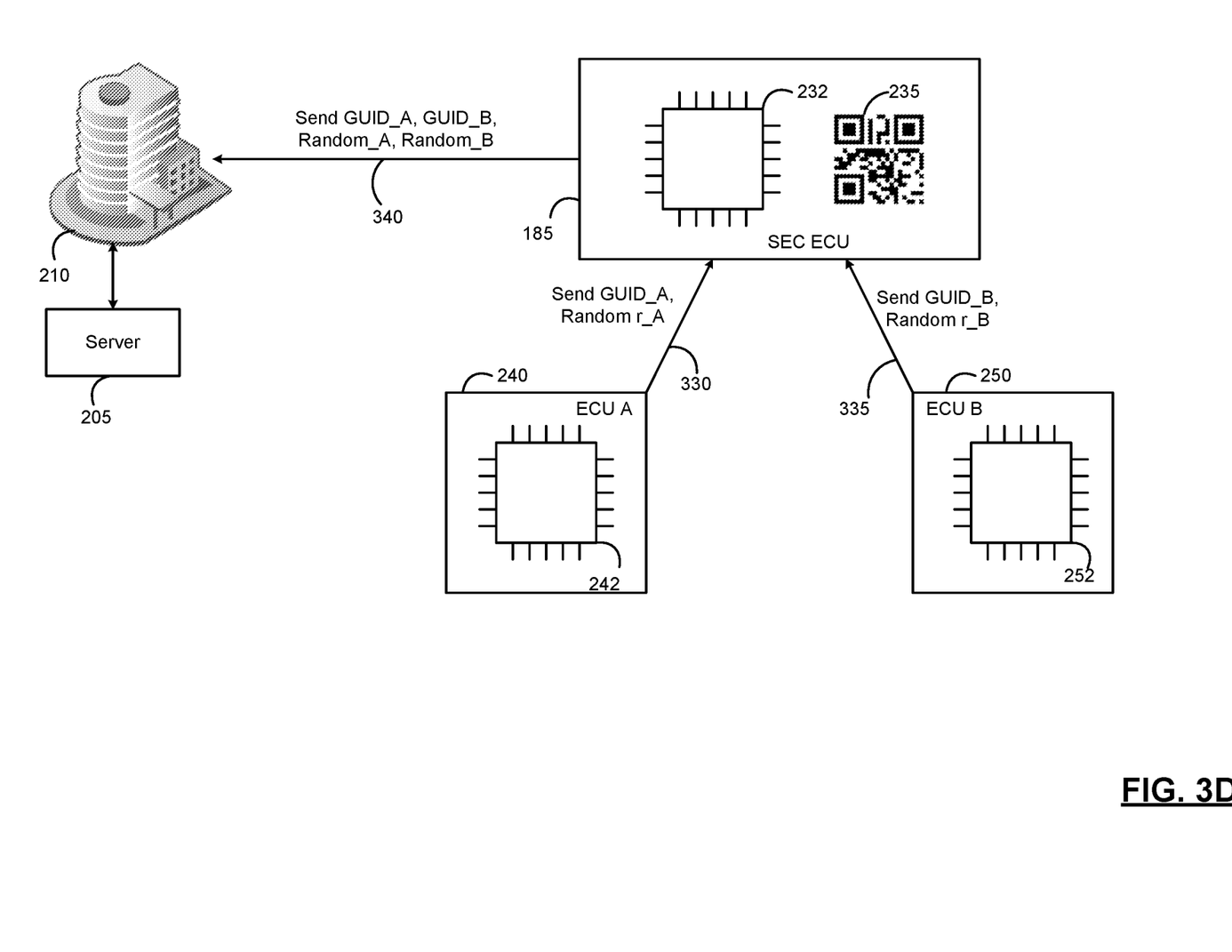

In FIG. 3D, each subsystem ECU module generates a random number and communicates with the security ECU module 185, identifying itself using its GUID value and the random number that it generated. By way of example, in 330, the subsystem ECU A module 240 transmits the GUID_A value and the random number r_A to the security ECU module 185. In 335, the subsystem ECU B module 240 transmits the GUID_B value and the random number r_B to the security ECU module 185.

Next, in 340, the security ECU module 185 transmits to the remote cryptographic module 205 the identity of each subsystem ECU module and the related GUID value and random number. So, for example, the security ECU module 185 identifies the subsystem ECU A module 240, its GUID_A value, and its associated random number r_A. The security ECU module 185 also identifies the subsystem ECU B module 250, as well as its GUID_B value, and its associated random number r_B. The security ECU module 185 repeats this process for all of the other subsystem ECU modules in the vehicle system 10.

During the assembly process for the vehicle system 10 in the manufacturing facility, the security ECU module 185 reports to the cryptographic module 205 all of the subsystem ECU modules installed in each vehicle system 10. To accomplish this, for each vehicle system 10, the security ECU module 185 transmits the vehicle identification number (VIN) and the secret information for each subsystem ECU module.

Figure 3E:
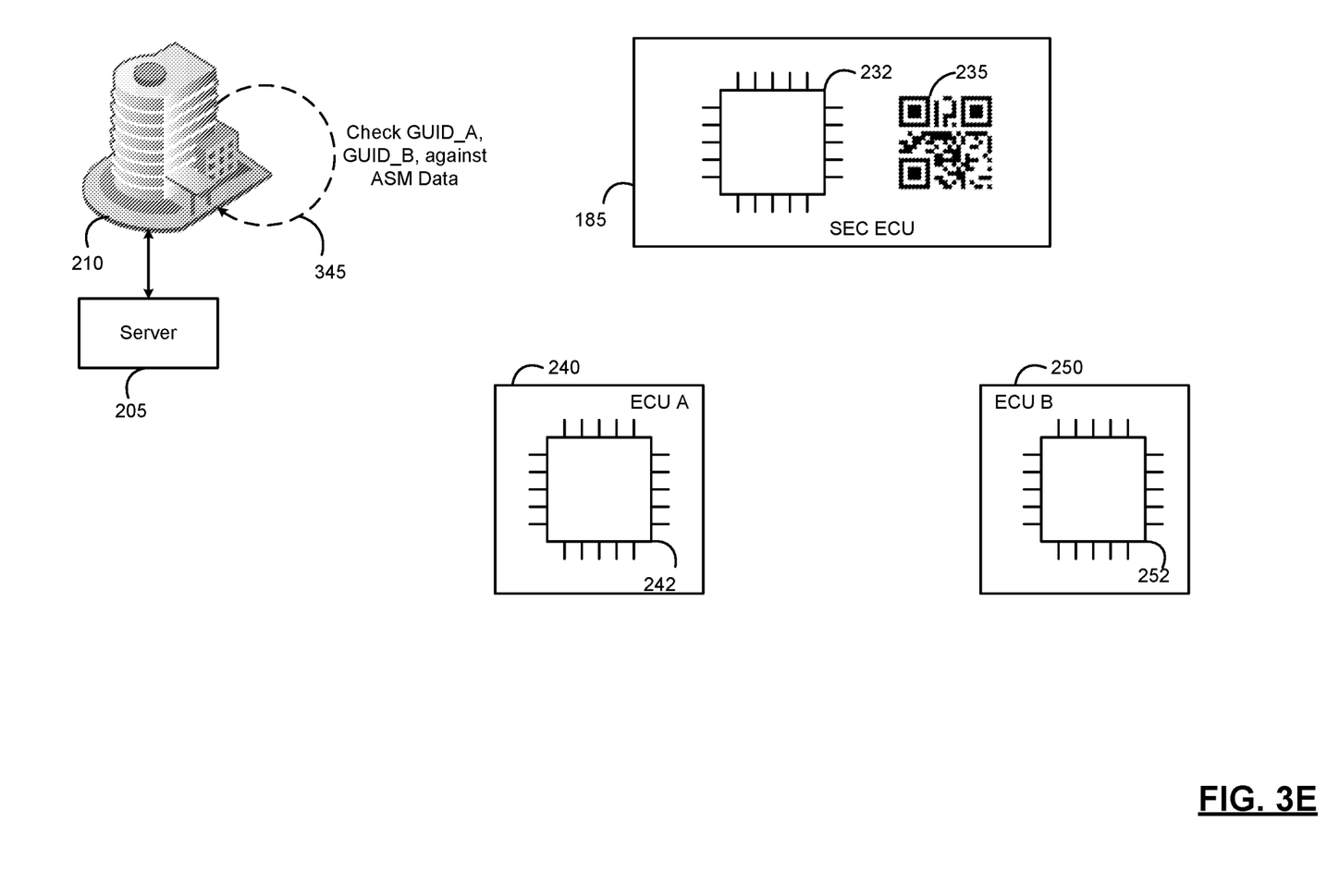
Figure 3F:
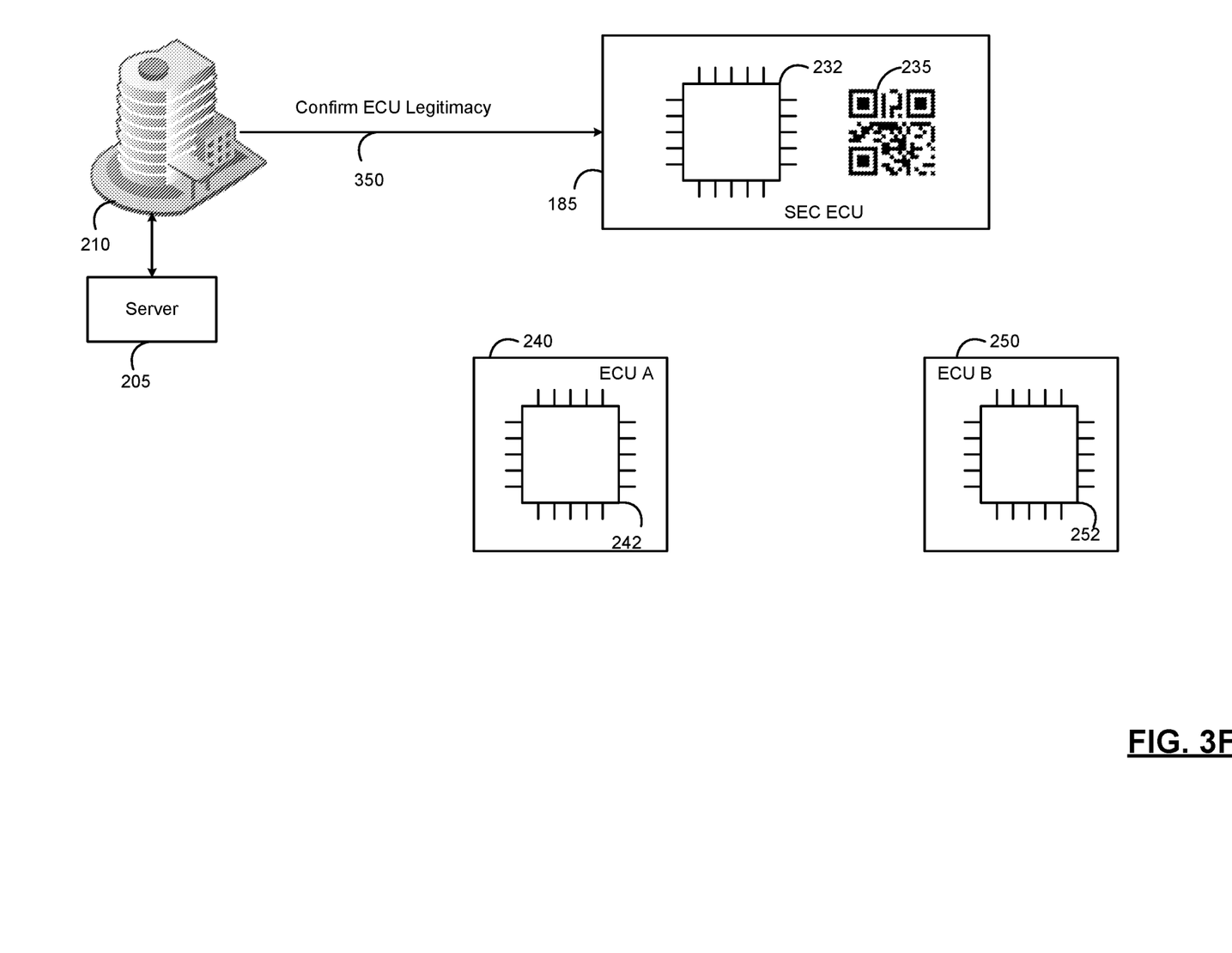

In FIG. 3E and FIG. 3F, the remote cryptographic module 205 and the back office 210 verify in 345 the GUID values for each subsystem ECU modules against the manufacturer assembly (ASM) data. The back office 210 uses the identity (e.g., manufacturer and part number) of each subsystem ECU module to verify that the GUID value for each subsystem ECU module matches the manufacturer data values. Assuming all subsystem ECU modules are verified, the back office 210 in 350 verifies the legitimacy of all of the subsystem modules associated with the vehicle system 185.

At this point, a known set of subsystem ECU modules and a known security ECU module are associated with the vehicle system 10. Subsequently, if a vehicle service is performed on the vehicle system 10, the remote cryptographic module 205 receives updates for replacement parts. For example, if a car dealer replaces an infotainment system in the vehicle system 10, the security ECU module 185 may send the GUID value and random number value of the replacement subsystem ECU module in the new infotainment system to the remote cryptographic module 205 and back office 210.

Figure 3G:
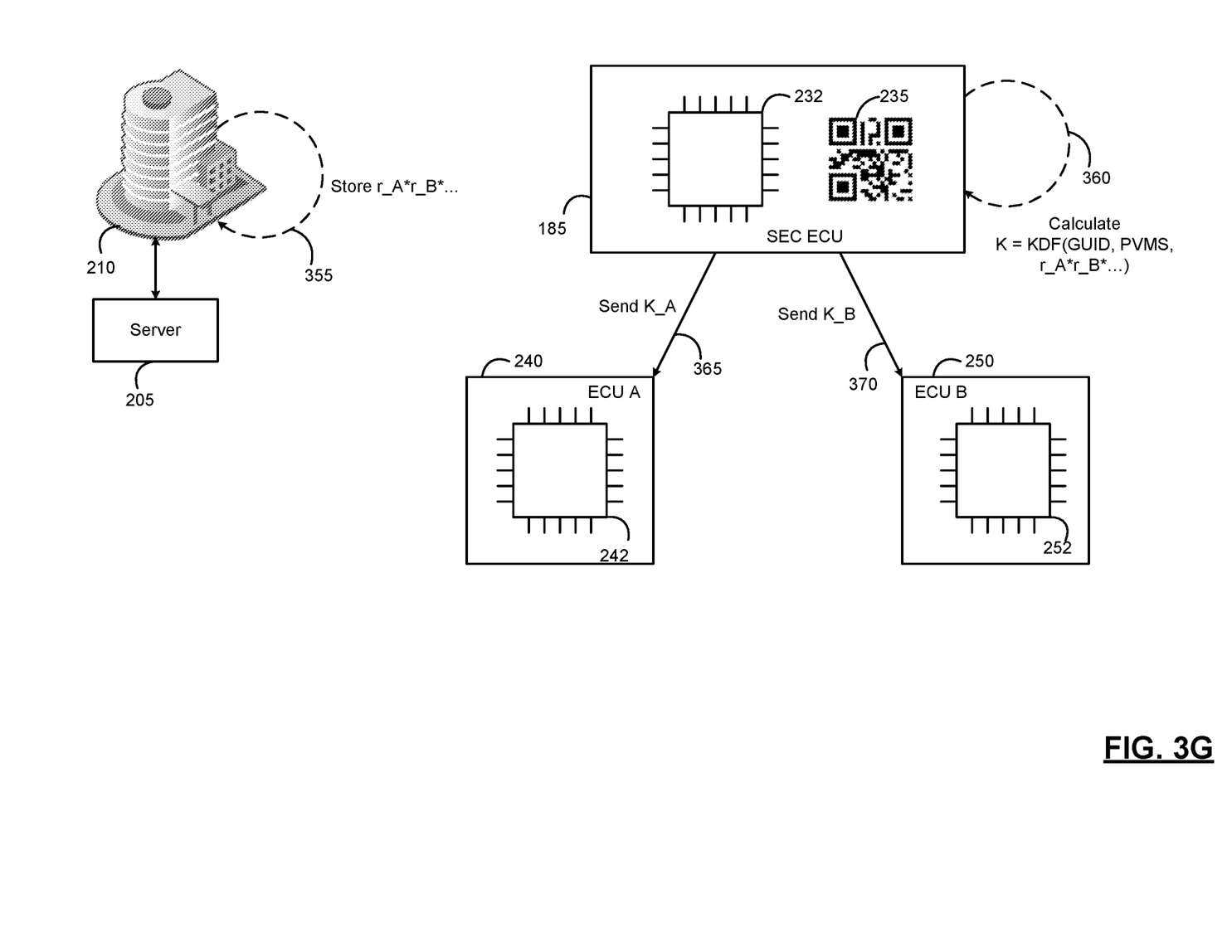

In FIG. 3G, the back office 210 may calculate and store in 355 the random numbers $r\_A, r\_B, \ldots r\_n$ that were received from the subsystem ECU modules. The security ECU module 185 in 360 generates a key for each subsystem ECU module using a key derivation function (KDF). The KDF generates a key, K, for a particular subsystem ECU module based on the GUID of the subsystem ECU module, the PVMS 235, and the random number for that subsystem ECU module. For example, the key, $K\_A$, for encrypting communications between the security ECU module 185 and the subsystem ECU A module 240 is determined as $K\_A=KDF(GUID\_A, PVMS\ 235, r\_A)$. After generating the keys, the security ECU module 185 transmits in 365 the key $K\_A$ to the subsystem ECU A module 240 and transmits in 370 the key $K\_B$ to the subsystem ECU B module 250.

Figure 3H:
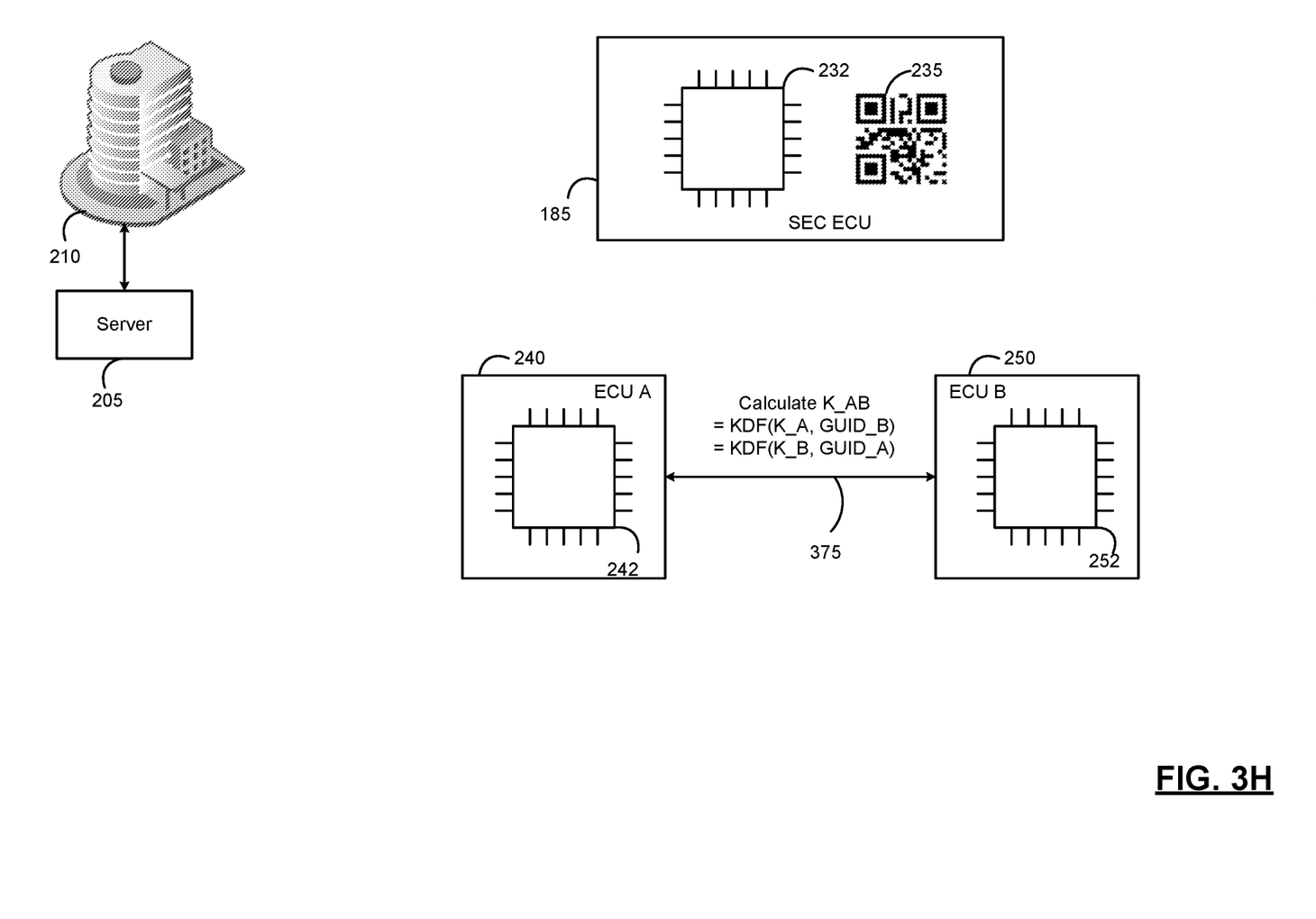

Finally, the subsystem ECU A module 240 and the subsystem ECU B module 250 generate unique keys for encrypting communications with each other. By way of example, the subsystem ECU A module 240 may generate a key for communicating with the subsystem ECU B module 250 using a key derivation function (KDF) based on its own key, $K\_A$, and the GUID_B of the subsystem ECU B module 250. Similarly, the subsystem ECU B module 250 will generate a key for communicating with the subsystem ECU A module 240 using a key derivation function (KDF) based on its own key, $K\_B$, and the GUID_A of the subsystem ECU A module 240. In this way, the subsystem ECU modules have an encrypted communication link with each other that only they can read.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An in-vehicle encryption system comprising a plurality of vehicle subsystems, an in-vehicle encryption system comprising:
 a security ECU module configured to communicate with a remote cryptographic module, the security ECU module comprising a processor and a per vehicle master secret (PVMS) value stored in the security ECU module, wherein the security ECU module uses the PVMS value to authenticate with the remote cryptographic module and to establish an external encrypted communication link with the remote cryptographic module;
 a first subsystem ECU module configured to generate a first globally unique identifier (GUID) and to transmit the first GUID value to the security ECU module; and a second subsystem ECU module configured to generate a second globally unique identifier (GUID) and to transmit the second GUID value to the security ECU module, wherein the security ECU module uses the first GUID value to establish a first encrypted communication link with the first subsystem ECU module, wherein the first subsystem ECU module is further configured to generate a first random number and to transmit the first random number to the security ECU module, wherein the security ECU module uses the second GUID value to establish a second encrypted communication link with the second subsystem ECU module, wherein the second subsystem ECU module is further configured to generate a second random number and to transmit the second random number to the security ECU module, and wherein the security ECU module is further configured to transmit the first GUID value, the first random number, the second GUID value, and the second random number to the remote cryptographic module via the external encrypted communication link.

2. The in-vehicle encryption system of claim 1, wherein the security ECU module further uses both the first random number and the first GUID value to establish the first encrypted communication link with the first subsystem ECU module.

3. The in-vehicle encryption system of claim 2, wherein the security ECU module generates a first key that is used to establish the first encrypted communication link, wherein the first key is based on the first random number, the first GUID value, and the PVMS value.

4. The in-vehicle encryption system of claim 3, wherein the security ECU module further uses both the second random number and the second GUID value to establish the second encrypted communication link with the second subsystem ECU module.

5. The in-vehicle encryption system of claim 4, wherein the security ECU module generates a second key that is used to establish the second encrypted communication link, wherein the second key is based on the second random number, the second GUID value, and the PVMS value.

6. The in-vehicle encryption system of claim 5, wherein the first subsystem ECU module is further configured to generate a third key that is used to establish a third encrypted communication link with the second subsystem ECU module, wherein the third key is based on the first random number and the second GUID value.

7. The in-vehicle encryption system of claim 6, wherein the second subsystem ECU module is further configured to generate a fourth key that is used to establish the third encrypted communication link with the first subsystem ECU module, wherein the fourth key is based on the second random number and the first GUID value.

8. A method of in-vehicle encryption for use in a vehicle system comprising a plurality of vehicle subsystems, the method comprising:
in a security ECU module comprising a processor and a per vehicle master secret (PVMS) value stored in the security ECU module;
    authenticating with a remote cryptographic module using the PVMS value; and
    establishing an external encrypted communication link with the remote cryptographic module using the PVMS value;
in a first subsystem ECU module, generating a first globally unique identifier (GUID) and transmitting the first GUID value to the security ECU module;
in a second subsystem ECU module, generating a second globally unique identifier (GUID) and transmitting the second GUID value to the security ECU module;
in the security ECU module, using the first GUID value to establish a first encrypted communication link with the first subsystem ECU module;
in the first subsystem ECU module, generating a first random number and to transmit the first random number to the security ECU module;
in the security ECU module, using the second GUID value to establish a second encrypted communication link with the second subsystem ECU module;
in the second subsystem ECU module, generating a second random number and to transmit the second random number to the security ECU module; and
in the security ECU module, transmitting the first GUID value, the first random number, the second GUID value, and the second random number to the remote cryptographic module via the external encrypted communication link.

9. The method of claim 8, further comprising:
in the security ECU module, using both the first random number and the first GUID value to establish the first encrypted communication link with the first subsystem ECU module.

10. The method of claim 9, further comprising:
in the security ECU module, generating a first key that is used to establish the first encrypted communication link, wherein the first key is based on the first random number, the first GUID value, and the PVMS value.

11. The method of claim 10, further comprising:
in the security ECU module, using both the second random number and the second GUID value to establish the second encrypted communication link with the second subsystem ECU module.

12. The method of claim 11, further comprising:
in the security ECU module, generating a second key that is used to establish the second encrypted communication link, wherein the second key is based on the second random number, the second GUID value, and the PVMS value.

* * * * *